United States Patent [19]

Youn

[11] Patent Number: 5,714,843
[45] Date of Patent: Feb. 3, 1998

[54] CRT SPOT KILLER CIRCUIT RESPONSIVE TO LOSS OF VERTICAL SYNCHRONIZING SIGNAL

[75] Inventor: Joo-Moon Youn, Suwon, Rep. of Korea

[73] Assignee: Samsung Electronicsco., Ltd., Suwon, Rep. of Korea

[21] Appl. No.: 550,813

[22] Filed: Oct. 31, 1995

[30] Foreign Application Priority Data

Oct. 31, 1994 [KR] Rep. of Korea .................. 94-28520

[51] Int. Cl.⁶ .................................................. H01J 29/98
[52] U.S. Cl. .............................. 315/1; 315/85; 348/378
[58] Field of Search ........................ 315/127, 85, 225,
315/1, 411; 348/377, 378

[56] References Cited

U.S. PATENT DOCUMENTS

| 5,430,596 | 7/1995 | Hamaguchi et al. ......... 315/411 X |
| 5,483,464 | 1/1996 | Song ............................... 364/492 |
| 5,491,794 | 2/1996 | Wu ............................ 395/182.08 |

FOREIGN PATENT DOCUMENTS 59-126369  7/1984  Japan ................................. 315/1

Primary Examiner—Robert Pascal
Assistant Examiner—Justin P. Bettendorf
Attorney, Agent, or Firm—Banner & Witcoff, Ltd.

[57] ABSTRACT

An improved spot elimination circuit for a monitor capable of Display Power Management Signaling function prevents an occurrence of a focused beam spot from the phosphor screen of a cathode ray tube in the monitor by suddenly dropping the potential level of a high voltage. The circuit includes a high voltage generator, a X-ray sensor, a X-ray protector, a controller and a spot killer circuit. The spot killer circuit actuates the X-ray protector to virtually instantaneously shut down a high voltage generated from the high voltage generator in response to a logic signal indicative of absence of a vertical synchronizing signal. The controller determines the vertical sync signal and generates the logic signal. Accordingly, the phosphor screen of the cathode ray tube is protected from excessive cathode luminance at a focused spot which can cause degradation of the screen.

13 Claims, 3 Drawing Sheets

CRT SPOT KILLER CIRCUIT RESPONSIVE TO LOSS OF VERTICAL SYNCHRONIZING SIGNAL

CROSS-REFERENCE TO RELATED APPLICATIONS

This application makes reference to, incorporates herein and claims all benefits accruing under 35 U.S.C § 119 from an application earlier filed in the Korean Industrial Property Office on Oct. 31, 1994, entitled SPOT KILLER CIRCUIT which was duly assigned Serial No.94-28520 by that Office.

BACKGROUND OF THE INVENTION

The present invention relates to an improved spot elimination circuit using an X-ray protection circuit in a monitor of a power management type, and more particularly, to a spot elimination circuit for eliminating the spot phenomenon which occurs on a display screen of a monitor capable of a Display Power Management Signaling (DPMS) function by rapidly reducing a high voltage at the instant a vertical synchronization signal from a signal source is no longer input.

Following the trend of the times, in an effort to save energy, a monitor capable of DPMS for saving energy by managing a power source of a monitor not in use are generally known. In such a monitor, a computer being a host system for the monitor selectively either supplies or shuts down both vertical and horizontal synchronization signals to the monitor so as to effectuate different power management state corresponding to the states of usage of the computer, and the monitor performs a power management function responsive to horizontal and vertical synchronization signals from the computer.

Here, a power management status is divided into four states, namely, On state, Stand-by state, Suspend state and Off state. On state is represented by both pulse signal outputs of horizontal and vertical synchronization signals, Stand-by state by only a pulse signal output of a vertical synchronization signal, Suspend state by only a pulse signal output of a horizontal synchronization signal, and Off state by none of both signals. By doing so, a power management state is able to be distinguished. As a result, a power management status is shifted, corresponding to the time elapsed while a computer is out of use, in consecutive order from On state into Stand-by state, Suspend state and finally Off state.

In FIG. 1, which is a block diagram illustrating briefly a power saving circuit employed in a conventional monitor, a signal supplier 10 responsive to the use of a computer outputs to a micro-processor 20 a logic signal indicative of a state being shifted from On state into Stand-by state, Suspend state and Off state following the consecutive time elapsed during which no signal input from a key pad is detected.

Micro-processor 20 driven by a driving voltage supply from power supply 40 outputs a signal of low state to voltage regulator 30 when a logic signal output from signal source 10 indicates either Suspend state mode or power off mode having no vertical synchronization signals, and otherwise outputs a signal of high state to voltage regulator 30.

Voltage regulator 30 regulates a driving voltage generated from power supply 40 into a voltage at a predetermined level when a signal of a high state is received from micro-processor 20 and then outputs the voltage to respective high voltage generator 70 and deflection circuit 90, and shuts off a voltage output when a signal of a low state is otherwise received.

X-ray sensor 80 detects a high voltage generated from high voltage generator 70 to output to X-ray protector 60.

X-ray protector 60, responsive to an output of X-ray sensor 80, prevents an excessive radiation of X-ray beyond a predetermined amount by causing high voltage generator 70 to stop a high voltage generation in excess of a predetermined voltage level thereby ceasing a horizontal oscillation. Namely, X-ray protector 60 gives a protection against X-ray radiation of dangerous levels and prevents a lead wire from departing away from a deflection yoke.

High voltage generator 70 generates a high voltage using a flyback transformer FBT to supply a stabilized DC voltage to the anode of a cathode ray tube CRT. If the level of a high voltage generated from high voltage generator 70 instantaneously increases due to an occurrence of a failure of a monitor, then X-ray sensor 80 detects the increase in level to actuate X-ray protector 60.

In the conventionally configured construction as described above and as shown in FIG. 1, there is a drawback of a spot phenomenon which occurs at the instant of initiation of operation in a mode of either Suspend state or Off state on the display screen of a monitor during a predetermined time interval (t+1) since a voltage level slowly drops as shown in FIG. 2.

SUMMARY OF THE INVENTION

It is therefore an object of the present invention to provide an improved spot elimination circuit.

It is another object to provide a spot elimination circuit for preventing a beam spot from occurring in either a Suspend state mode or Off state mode an wherein X-ray protector is actuated to suddenly drop a high voltage.

A spot elimination circuit constructed according to the principles of the present invention is contemplated with a circuit including a high voltage generator for generating a high voltage using a flyback transformer, an X-ray sensor for sensing the high voltage output of the high voltage generator to output a control signal and an X-ray protector responsive to an abnormal level of the control signal output of the X-ray protector for shutting down a high voltage generated from the high voltage generator so as to prevent an excessive radiation of X-ray beyond a predetermined level, which circuit comprises a control means for sensing a horizontal synchronization signal input from a computer to output a logic signal corresponding thereto and a spot killer circuit means for actuating the X-ray protector to virtually instantaneously shut off a high voltage generation in the high voltage generator when the logic signal output from control means indicates lack of a vertical synchronization signal.

A more complete appreciation of the present invention, and many of the attendant advantages thereof, will become readily apparent and are best understood by reference to the following detailed description when considered in conjunction with the accompanying drawings.

In the following detailed description, many specific details are set forth to provide a more thorough understanding of the present invention. It will be apparent, however, to those skilled in the art, that the present invention may be practiced without these specific details. In other instances, well known circuit components have not been described so as not to obscure the present invention.

DETAILED DESCRIPTION OF PREFERRED EMBODIMENT

Figure 3:
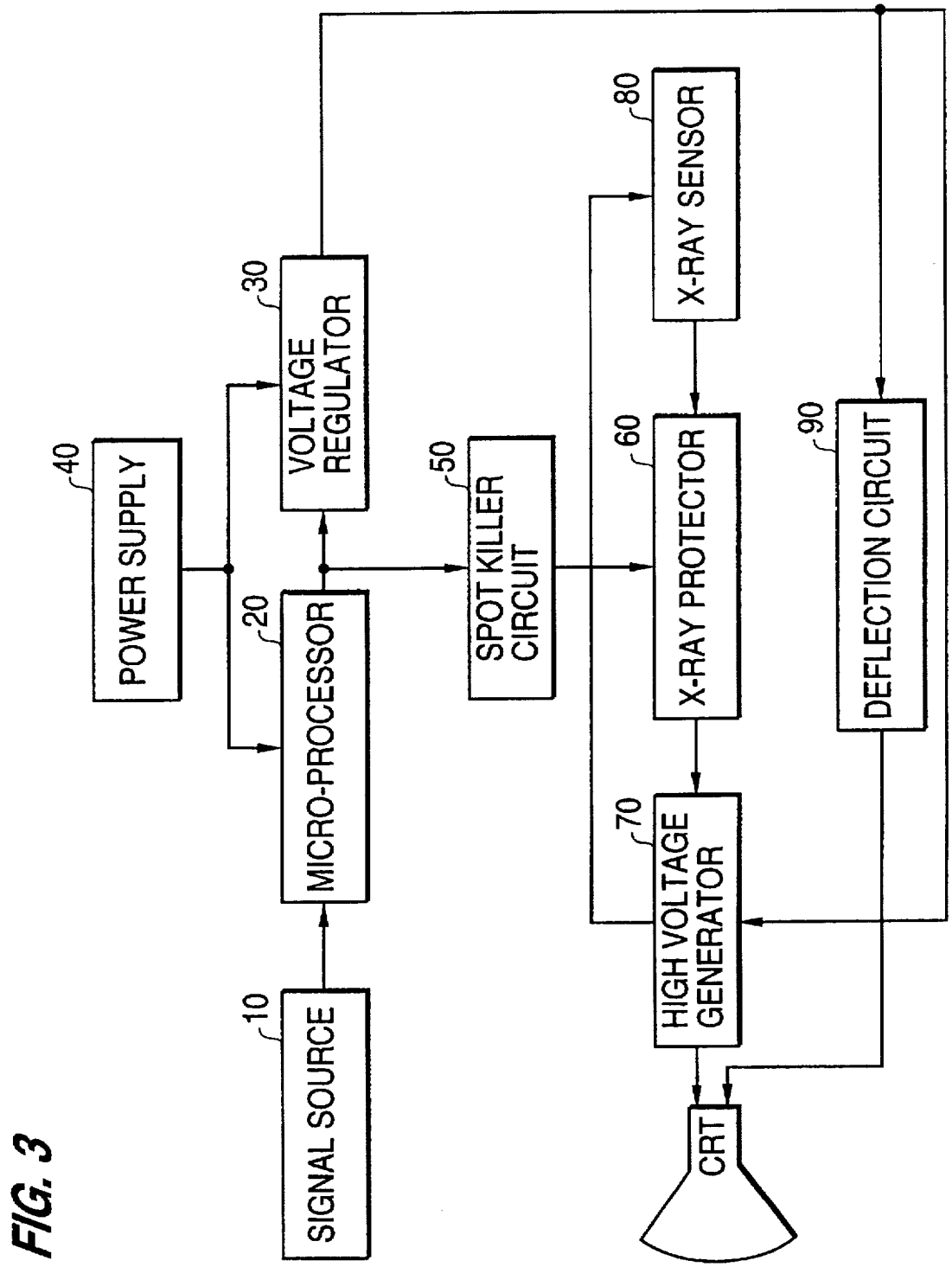
FIG. 3 is a block diagram illustrating a spot elimination circuit in accordance with a preferred embodiment of the present invention incorporating an improved spot killer circuit.

Turning now to the drawings, a representation of an exemplary design for a spot elimination circuit is illustrated in block form in FIG. 3. A signal source 10 receives a horizontal synchronization signal and/or a vertical synchronization signal corresponding to any one of several states, i.e., On state, Stand-by state, Suspend state or Off state, respectively representing the status of use of a computer, and outputs a logic signal indicative of the DPMS state corresponding thereto. Signal source 10 is connected to a microprocessor 20 which outputs a logic signal of either high state or low state responsive to the logic signal input of DPMS.

A voltage regulator 30 for generating a driving voltage is connected to an output terminal of micro-processor 20. A power supply 40 is connected to both input terminals of micro-processor 20 and voltage regulator 30. A spot killer circuit 50 for generating a signal of either high state or low state responsive to an output of micro-processor 20 is connected to an output port of micro-processor 20. Spot killer circuit 50 is also connected to an X-ray protector 60 which is actuated by an input signal supplied from the circuit. A high voltage generator 70 is connected to X-ray protector 60 and voltage regulator 30, in which a high voltage is generated by utilizing a flyback transformer so as to supply a stabilized DC voltage to an anode of a cathode ray tube. The high voltage generated is shut off by X-ray protector 60 as necessary.

High voltage generator 70 is connected to an input terminal of an anode of a cathode ray tube and to and X-ray sensor 80 which detects a sudden increment of the level of a high voltage owing to, for example, a failure of a monitor so as to actuate X-ray protector 60.

Voltage regulator 30 is connected to a deflection circuit 90 for deflecting a cathode ray tube by using a driving voltage supplied from the regulator. Deflection circuit 90 ceases an oscillation operation for deflection when a high voltage generation in high voltage generator 70 is shut off by X-ray protector 60.

Figure 1:
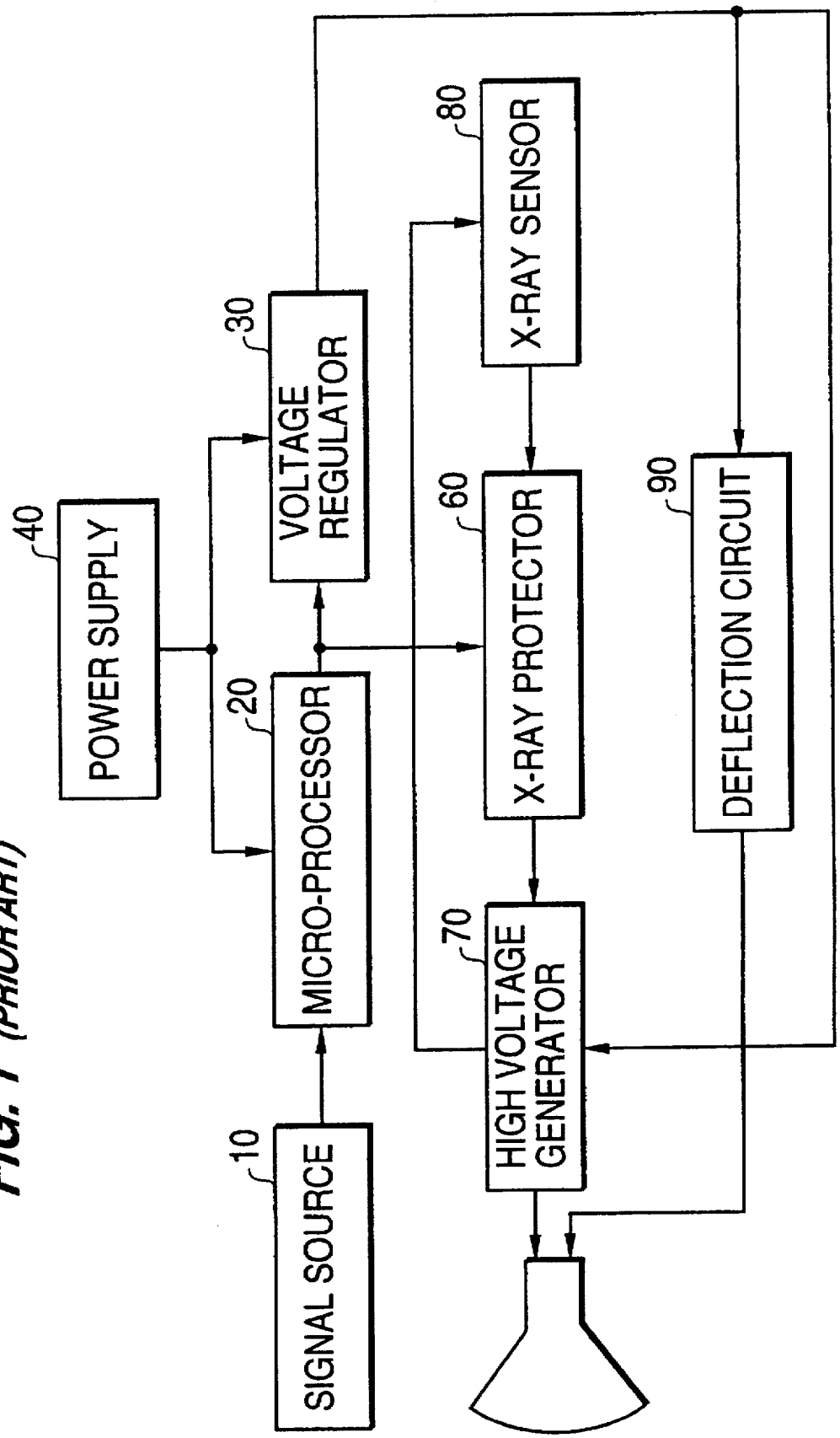
FIG. 1 is a block diagram illustrating a power-saving circuit in a conventional design of a monitor.
Figure 4:
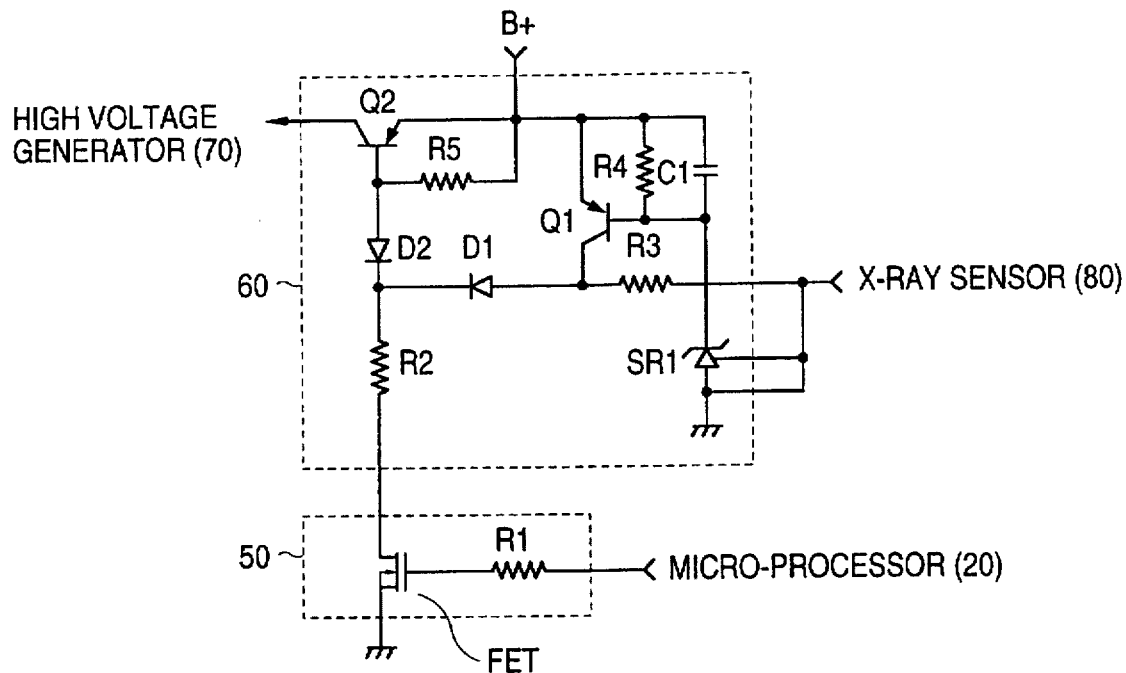
FIG. 4 is a detailed circuit diagram of an improved spot killer circuit and a X-ray protector of FIG. 3
Figure 2:
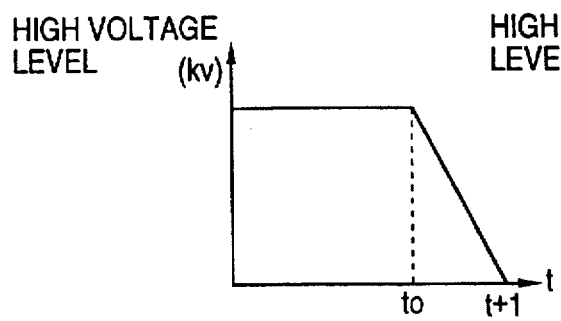
FIG. 2 is a waveform diagram illustrating a high voltage waveform of FIG. 1.

Referring now to FIG. 4 which shows in detail circuits of spot killer circuit 50 and X-ray protector 60, similar reference numerals designate corresponding elements as discussed with regard to FIG. 3. Spot killer circuit 50 comprises a field effect transistor FET whose gate electrode is connected to micro-processor 20 via an impedance matching resistor R1. The field effect transistor FET serves as an inverter. When a signal of low state is input to the gate electrode of the FET, a signal output of high state is supplied to X-ray protector 60 via the drain terminal of the FET, while a signal of high state input causes a signal generation of low state at the drain terminal. X-ray protector 60 incorporates a shunt regulator SR1, being turned ON when a voltage level of a signal output of X-ray sensor 80 is higher than a predetermined level, whose cathode electrode terminal is connected to the base terminal of first transistor Q1.

A capacitance C1 for noise squelch and a bias resistor R4 is connected in parallel between terminals of the base electrode and emitter electrode of first transistor Q1.

In addition, a resistor R3 for shunt regulator SR1 latch-up bias is connected between the collector electrode of first transistor Q1 and X-ray sensor 80. Diodes D1, D2 for prevention of inverse current flowing are serially connected between the collector electrode of first transistor Q1 and the base electrode of second transistor Q2. A connecting node of diodes D1, D2 is connected to the drain electrode of field effect transistor of spot killer circuit 50 via a resistor R2 adapted for controlling a FET current.

Whereas the collector electrode of first transistor Q1 and the drain electrode of field effect transistor FET of spot killer circuit 50 are connected in parallel to the base electrode of second transistor Q2, second transistor Q2 is turned off on either occasion of first transistor being turned ON or a signal of high state being generated from spot killer circuit 50, thereby shutting off a high voltage generation from high voltage generator 70.

A secondary voltage supply B+, which is provided during main power supply, is supplied to the base electrode of second transistor Q2 via a resistor R5 and emitter electrodes of both transistors Q1 and Q2. The collector electrode of second transistor Q2 is in turn connected to high voltage generator 70. Transistors Q1, Q2 are of PNP type.

Referring now to the above configuration, signal source 10 responsive to the status of use of a computer outputs to micro-processor 20 a logic signal representing a state sequentially shifting from On state into Stand-by state, Suspend state and Off state following the time elapsed of no input signal from a key pad during a predetermined interval of time.

Micro-processor 20 driven by a driving voltage supplied from power supply 40, generates to spot killer circuit 50 and voltage regulator 30 a signal of a low state when a logic signal input applied from signal source 10 represents a Suspend state mode or a power off mode having no vertical synchronizing signal, and otherwise generates a signal of a high state.

Once a signal of a high state is input from micro-processor 20, then voltage regulator 30 regulates a driving voltage supplied from power supply 40 into a voltage at a predetermined level to output the regulated voltage to high voltage generator 70 and deflection circuit 90, where as a signal of a low state then shuts off a supply of a driving voltage.

As an inverter gate, the field effect transistor FET in spot killer circuit 50 generates a signal of a high state to X-ray protector 60 when a signal of a low state is input from micro-processor 20. As a result, since a secondary voltage supply with a voltage drop across diode D2 is applied to the base electrode of second transistor Q2, voltages at substantially even potential level are applied to the respective electrode of emitter and base thereby maintaining a turn off state.

Figure 5:
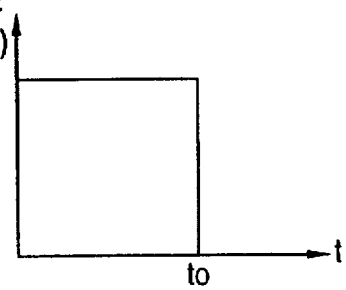
FIG. 5 is a waveform diagram illustrating a high voltage waveform of FIG. 3.

Once second transistor Q2 is turned on, then secondary voltage supply B+ is no longer applied to high voltage generator 70 thereby instantaneously dropping a high voltage level as shown in FIG. 5 to eliminate a beam spot occurring in a suspend state or a power off state.

While second transistor Q2 is turned on under normal operation status of X-ray protector 60, high voltage generator 70 utilizes a flyback transformer to cause a high voltage generation to supply to an anode of a cathode ray tube and to X-ray sensor 80.

X-ray sensor 80 senses a high voltage generated from high voltage generator 70 and outputs a high level signal to shunt regulator SR1 of X-ray protector 60 in case of a sudden increase of the level of the sensed high voltage due to, for example, an occurrence of a monitor failure.

Shunt regulator SR1 is turned ON when a high voltage is inputted at its terminals, namely a voltage of a level being higher than a predetermined level, and in turn outputs a signal of low state to the base electrode of first transistor Q1.

When a signal of low state is inputted to the base electrode of first transistor Q1, then it is turned ON thereby enabling a secondary voltage supply (B+) to bypass through the transistor Q1. The base and emitter electrode of second transistor Q2 are then in the state of substantially equipotential, thereby causing the transistor to be turned off.

As a result, secondary transistor Q2 is not able to generate a secondary voltage supply (B+) to high voltage generator 70 during the time period of being turned off, thereby causing the generator to suddenly drop a high voltage to stop a horizontal oscillation operation resulting in a prevention of excess X-ray radiation above a predetermined level of amount.

In other words, X-ray protector 60 gives a protection from X-ray radiation of a harmful level and prevents a lead wire from departing out of deflection yoke.

When an output signal of X-ray sensor 80 is of low state indicative of a normal operation, shunt regulator SR1 then becomes in an off state thereby turning off first transistor Q1 and, in turn, turning on second transistor Q2, causing secondary voltage supply (B+) to be applied to high voltage generator 70.

According to the spot elimination circuit as described above, X-ray protector 60 is actuated to virtually instantaneously shut off a high voltage in a suspend mode or in a power off state wherein a vertical synchronizing signal is absent in a monitor capable of a DPMS function thereby preventing an occurrence of a spot displayed on the phosphor screen of a CRT in the monitor.

While there has been illustrated and described what is to be considered the preferred embodiment of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the scope thereof. Therefore, it is understood that the present invention is not limited to the particular embodiments disclosed as the best mode contemplated for carrying out the present invention, but that the present invention includes all embodiments falling within the scope of the appended claims.

What is claimed is:

1. A spot eliminator for a monitor apparatus, said spot eliminator incorporating a high voltage generator for generating a high voltage using a flyback transformer, an X-ray sensor for sensing a high voltage generated from said high voltage generator and outputting a control signal, and an X-ray protector being driven at the instant that said control signal, indicates an abnormal level of said high voltage for shutting off said abnormal high voltage so as to repel an excessive radiation of an X-ray beam beyond a predetermined level, said spot eliminator comprising:

a control means for sensing a vertical synchronization signal input from a computer system and generating a logic signal corresponding thereto; and a spot killer circuit for actuating said X-ray protector in response to said logic signal indicative of absence of said vertical synchronizing signal to virtually instantaneously shut off said high voltage generation from said high voltage generator.

2. The spot eliminator of claim 1, wherein said spot killer circuit is connected to said X-ray protector in parallel with said X-ray sensor.

3. The spot eliminator of claim 1, wherein said spot killer circuit comprises an inverter coupled to an output transistor of the x-ray protector circuit, such that both the spot killer circuit and the x-ray sensor each independently control the output transistor of the x-ray protector circuit to virtually instantaneously shut off said high voltage generation from said high voltage generator.

4. The spot eliminator of claim 1, wherein said spot killer circuit comprises a field effect transistor capable of an inverter function.

5. Apparatus for preventing formation of a spot on a screen of a video display device, the video display device containing a high voltage generator for generating a high voltage for a beam on the screen, an X-ray sensor for detecting an increase in the high voltage, and a power saving circuit which provides an output signal indicating a power saving mode, the apparatus comprising:

X-ray protection means, having a first terminal coupled to the high voltage generator and a second terminal coupled to the X-ray sensor, for reducing the high voltage generated by the high voltage generator in response to an output of the X-ray sensor; and spot killer means, coupled to the power saving circuit and the X-ray protection means, for activating the X-ray protection means to virtually instantaneously reduce the high voltage generated by the high voltage generator in response to the output signal indicating the power saving mode.

6. The apparatus of claim 5, wherein the output signal of the power saving circuit corresponds to lack of a vertical synchronization signal.

7. The apparatus of claim 5, wherein the spot killer means comprises a transistor, coupled to the power saving circuit, wherein in response to the output signal indicating the power saving mode, the transistor activates a second transistor in the X-ray protection means which virtually instantaneously drops the high voltage level of the high voltage generator.

8. The apparatus of claim 5, wherein the X-ray protection means comprises:

a first transistor, coupled to the X-ray sensor, for cutting off a secondary voltage normally supplied to the high voltage generator, and a second transistor, coupled to the high voltage generator, the spot killer means and to the first transistor, for cutting off the secondary voltage supply normally supplied to the high voltage generator in response to the output signal indicating the power saving mode.

9. The apparatus of claim 8, wherein the spot killer means comprises a field effect transistor, coupled between the power saving circuit and the second transistor of the X-ray protection means, for controlling the second transistor in response to the output signal indicating the power saving mode.

10. Apparatus for preventing formation of a spot on a screen of a video display device, the video display device containing a high voltage generator which generates a high voltage for a beam on the screen and an X-ray sensor for detecting an increase in the high voltage, the apparatus comprising:

a power saving circuit which operates in an "on" state corresponding to presence of a horizontal synchronization signal and a vertical synchronization signal, a "standby" state corresponding to absence of the horizontal synchronization signal and presence of the vertical synchronization signal, a "suspend" state corresponding to presence of the horizontal synchronization signal and absence of the vertical synchronization signal, and an "off" state corresponding to absence of the horizontal synchronization signal and the vertical synchronization signal;

an X-ray protection circuit, coupled to the high voltage generator and to the X-ray sensor, which reduces the high voltage generated by the high voltage generator in response to an output of the X-ray sensor; and a spot killer circuit, coupled to the power saving circuit and the X-ray protection circuit, which activates the X-ray protection circuit to reduce the high voltage generated by the high voltage generator when the power saving circuit is in the "suspend" state or in the "off" state.

11. The apparatus of claim 10, wherein the power saving circuit switches in consecutive sequence between the "on" state, "standby" state, "suspend" state, and "off" state in response to elapsed time during which a computer coupled to the video display device is not being used.

12. The apparatus of claim 10, wherein the spot killer circuit comprises a field effect transistor which is coupled to an output transistor of the X-ray protection circuit to virtually instantaneously disable the high voltage generator when the power saving circuit switches to either the "suspend" state or the "off" state.

13. Apparatus for eliminating spots on a video display device having a power saving mode, the apparatus comprising:

a high voltage generator which generates a high voltage for driving a CRT;

an X-ray sensor which senses an excessively high voltage generated by the high voltage generator and provides an output signal in response thereto;

an X-ray protector circuit, directly coupled between the high voltage generator and the X-ray sensor, which directly controls the high voltage generator to drop the high voltage in response to receiving the output signal from the X-ray sensor, wherein the X-ray protector circuit comprises an output transistor which is directly responsive to the output signal of the X-ray sensor;

a microprocessor which generates a mode change signal in response to detecting a power saving mode change; and a spot killer circuit, directly coupled to the microprocessor and responsive to the mode change signal, and directly coupled to and exerting control over the X-ray protector circuit, wherein the spot killer circuit, in response to the mode change signal, controls the output transistor of the X-ray protector circuit to virtually instantaneously drop the high voltage generated by the high voltage generator.

\* \* \* \* \*